United States Patent
Babonneau et al.

(10) Patent No.: US 6,944,230 B2
(45) Date of Patent: Sep. 13, 2005

(54) DEVICE AND METHOD FOR MOTION-COMPENSATED RECURSIVE FILTERING OF VIDEO IMAGES

(75) Inventors: Jean-Yves Babonneau, L'Hermitage (FR); Olivier Le Meur, Rennes (FR); Juan Moronta, Rennes (FR); Dominique Touchais, La Bouexière (FR)

(73) Assignee: Thomson Licensing, Boulogne-Billancourt (FR)

(*) Notice: Subject to any disclaimer, the term of this patent is extended or adjusted under 35 U.S.C. 154(b) by 470 days.

(21) Appl. No.: 10/296,689

(22) PCT Filed: May 16, 2001

(86) PCT No.: PCT/EP01/05564

§ 371 (c)(1),
(2), (4) Date: Nov. 26, 2002

(87) PCT Pub. No.: WO01/93593

PCT Pub. Date: Dec. 6, 2001

(65) Prior Publication Data

US 2003/0169820 A1 Sep. 11, 2003

(30) Foreign Application Priority Data

| May 31, 2000 | (EP) | ............................................. 00401558 |
| Jul. 24, 2000 | (FR) | ............................................. 00 09684 |

(51) Int. Cl.$^7$ ................................................ H04N 7/18
(52) U.S. Cl. ........................... 375/240.29; 375/240.26
(58) Field of Search ....................... 375/240.01–240.29

(56) References Cited

U.S. PATENT DOCUMENTS

| 5,150,432 A | * | 9/1992 | Ueno et al. ................. 382/250 |
| 5,412,484 A | * | 5/1995 | Yoshikawa ................... 382/246 |
| 5,832,234 A | | 11/1998 | Iverson et al. ......... 395/200.77 |
| 6,639,942 B1 | * | 10/2003 | Bayazit ................... 375/240.01 |
| 2002/0118748 A1 | * | 8/2002 | Inomata et al. ........ 375/240.04 |

FOREIGN PATENT DOCUMENTS

| EP | 535 684 A1 | 4/1993 | .......... H04N/7/137 |
| EP | 735 747 A1 | 10/1996 | ............ H04N/5/44 |
| EP | 957 367 A1 | 11/1999 | ........... G01R/29/00 |

OTHER PUBLICATIONS

V. Ruiz et al., "An 8×8–Block Based Motion Estimation Using Kalman Filter," Oct. 1997, p. 140–143, IEEE, Greece.

* cited by examiner

*Primary Examiner*—Andy Rao
(74) *Attorney, Agent, or Firm*—Joseph S. Tripoli; Ronald H. Kurdyla; Guy H. Eriksen

(57) ABSTRACT

The present invention relates to a device and a process for motion-compensated recursive filtering and a corresponding coding system. The device comprises in particular a blockwise motion estimation module [(2)], means [(3)] for determining a recursivity noise level ($\sigma_{rec}$), a module (4) for calculating a prediction error ($\epsilon$), a module [(5)] for calculating a recursivity coefficient ($\alpha$) as a function of the recursivity noise level and of the prediction error, means [(6)] for calculating a motion-compensated image and means of filtering [(7, 8)] producing a weighting, by the recursivity coefficient, of the current input image and of a filtered and motion-compensated image stored previously. The device also comprises means [(3)] for determining an immobility noise level ($\sigma_{imm}$), and an assembly [(11, 12)] for processing zones constituting partitions of the blocks employed for the motion estimation, zeroing the motion vectors (d) associated with the zones in which the FDs are below a threshold dependent on the immobility noise level.

10 Claims, 1 Drawing Sheet

DEVICE AND METHOD FOR MOTION-COMPENSATED RECURSIVE FILTERING OF VIDEO IMAGES

This application claims the benefit under 35 U.S.C. § 365 of International Application PCT/EP01/05564, filed May 16, 2001, which was published in accordance with PCT Article 21(2) on Dec. 6, 2001 in French, and which claims the benefit of French Application No. 00/09684, filed on Jul. 24, 2000, and which claims the benefit of European Application No. 00401558.2 filed on May 31, 2000.

BACKGROUND OF THE INVENTION

Field of the Invention

The present invention relates to a device and to a process for motion-compensated recursive filtering, as well as to a corresponding coding system.

It pertains to noise reduction techniques applied to digital video signals. These techniques are applied generally to digital video images taking the form of a matrix of samples; each sample is composed of a luminance signal and, for a colour signal, of a chrominance signal.

The acquisition of video image sequences is still today largely carried out in analogue form so that the images, once acquired and possibly transmitted and stored in analogue formats, exhibit an appreciable share of noise in their content. Once digitized, these images are also often subjected to storage/editing operations which, in turn, introduce noise, this time of a digital nature. Finally, an image sequence generally undergoes a succession of transformations, the result of which is spatio-temporal noise of a highly random nature.

To obtain high-performance operation, the noise reduction methods calling upon recursive filtering consider the very strong temporal correlation of the images of a video sequence. Consequently, the concepts of motion and of displacement are important for achieving effective noise reduction.

"Displacement" is understood to mean the change of position of an object in a scene, this change of position being localized and specific to this object. "Motion" is understood to mean all of the displacements of objects in a video sequence.

Motion is conventionally detected either by simple image-to-image differencing, or by using a motion estimator. In the first case, pixel-to-pixel image differences or FDs (Frame Differences) at distinct instants are employed.

In the second case (use of a motion estimator), the displacements are taken into account by performing image differencing at distinct instants. These displacements are represented by motion vector fields applied to pixels (pixelwise motion estimation) or to blocks (blockwise motion estimation). Motion-compensated image differences are thus obtained, called DFDs (Displacement Frame Differences), pixelwise or blockwise. The second method gives much better results than the first, at the cost of greater complexity.

According to known techniques of noise reduction by motion-compensated recursive filtering, a weighting of a current image signal u and of a predictive signal v, obtained by means of an earlier motion-compensated and then filtered input signal, is performed. The weighted signal thus obtained is produced at output as the filtered signal and is recorded for later instants. The weighting coefficient of the current input signal u and the weighting coefficient of the predictive signal v are based on the calculation of a recursivity coefficient $\alpha$. In high-performance systems, this coefficient is calculated on the basis of a noise estimate and of the current prediction error, equal to the difference between the current signal u and the predictive signal v.

Generally, the determination of the recursivity coefficient $\alpha$ is based on noise level estimation, often obtained from information about DFDs emanating from a motion estimator. Specifically, the DFDs are fairly representative of the amount of noise contained in a video sequence. The DFDs even give an exact expression the therefor if the motion compensation is ideal (that is to say if the compensation is perfect, whatever the nature of the motion and the deformations).

These techniques afford significant advantages: the reduction in noise applies over the entire image, the estimation of the noise level is performed over the whole image and the risks of confusion between noise and useful signal are minimized. However, the estimation of the actual noise level is biased because the motion estimator is not ideal. Specifically, the accuracy of the estimator is limited by a certain number of factors arising on the one hand from implementational constraints (accuracy of coding of the motion vectors, maximum excursion of these vectors, etc.) and on the other hand from constraints intrinsic to the motion estimators (for example difficulties in reliably estimating rotational motions or those originating from a homothety). Moreover, the use of a motion estimation algorithm based on the concept of pixel blocks (commonly called "Block Matching") accentuates some of these defects. This lack of accuracy, also dependent on the source and on its quality (noisy or otherwise), gives rise to an overestimate (on account of an increase in the DFDs) of the actual noise level. Consequently, the filtering is too severe causing a blurring effect. Finally, in the presence of noise and in static zones, the sensitivity of the motion estimator to noise may cause a lack of homogeneity of the vector field giving rise to a real distortion of filtering of these zones. This degradation, which is manifested as a temporal flickering and swarming effect, is detrimental and hardly acceptable.

SUMMARY OF THE INVENTION

The present invention relates to a motion-compensated recursive filtering device based on blockwise motion estimation, which makes it possible to obtain good image quality, while considerably reducing the negative effects set forth hereinabove.

The invention also pertains to a coding system comprising such a device and to a corresponding motion-compensated recursive filtering process.

For this purpose, the invention concerns a device for the motion-compensated recursive filtering of video images before coding. This device comprises:

means of storage of at least one input image, a blockwise motion estimation module, designed to produce motion vectors blockwise and quantities representative of variations in motion-compensated images, on the basis of a current input image and of at least one input image stored previously in the means of storage, means for determining a recursivity noise level as a function of at least the quantities representative of variations in motion-compensated images, a module for calculating a prediction error, between a current input image and an image predicted previously by filtering and motion compensation, a module for calculating a recursivity coefficient as a function of the recursivity noise level and of the prediction error, means for calculating a motion-compensated image on the basis of a filtered image and of the motion vectors, means of filtering, intended to produce a weighting of the current input image and of a filtered and motion-compensated image stored previously, by the recursivity coefficient, and means of storage of at least one filtered and motion-compensated image.

According to the invention, the filtering device comprises:

means for determining an immobility noise level as a function of at least the quantities representative of variations in motion-compensated images, and an assembly for processing zones constituting partitions of the blocks employed for the motion estimation, comprising:

means of calculation in the said zones, of quantities representative of variations in images preserved in space, on the basis of a current input image and of at least one input image stored previously in the means of storage of input images, and means of zeroing the motion vectors associated with the said zones when the quantities representative of variations in images preserved in space are below a threshold dependent on the immobility noise level.

The expression "quantities representative of variations in motion-compensated images" is understood to mean quantities which quantify temporal modifications in an image sequence (preferably blockwise) by taking account of the motion estimation. These quantities advantageously consist of the DFDs. The expression "quantities representative of variations in images preserved in space" is understood on the other hand to mean quantities which quantify modifications in an image sequence (preferably blockwise) without motion compensation. They advantageously consist of FDs.

The device of the invention is therefore based on a coupling between blockwise motion filtering and static filtering applied to zones forming partitions of these blocks. The static filtering is thus implemented with a finer granularity than a straightforward blockwise processing. This device makes it possible to improve the quality of the video signal by distinguishing, in each block processed, static zones and zones in motion.

Advantageously, the assembly for processing zones uses zones consisting of subblocks of the blocks employed for the motion estimation.

The use of blockwise motion estimation (of the Block Matching type) further exhibits the advantages of a highly integrated and proven solution. For example, for the MPEG2 video compression standard, the motion estimation is a motion estimation working with blocks 16×8 pixels in size.

The means for calculating motion-compensated images use the filtered images (which are the output images) and the motion vectors, after prior processing of the latter by the assembly for processing zones.

The two noise levels used in the device of the invention essentially have the following functions:

the recursivity noise level ($\sigma_{rec}$) is intended for the calculation of the recursivity coefficient of the recursive filter, and the immobility noise level ($\sigma_{imm}$) is intended for the detection of static zones of the static filtering; it makes it possible to detect, by way of a threshold dependent on this immobility noise level, image zones which are spatially identical (to within the threshold) for different time instants.

The threshold dependent on the immobility noise level $\sigma_{imm}$ is advantageously equal to (MAX denoting the maximum):

$$\text{MAX}(k \times \sigma_{imm}; S0),$$

where k is a multiplier coefficient and S0 represents a floor for the threshold. Thus, the threshold level is forced to a low value when this threshold becomes too small, so as to be able to detect fixed zones even in the presence of little noise. The coefficient k is preferably between 1 and 2, and equals 1.5 in an advantageous embodiment.

In other modes of determination of the threshold, the latter is a linear function of the immobility noise level $\sigma_{imm}$, and in a particular embodiment, is equal thereto.

In a first embodiment pertaining to the determination of the noise levels, the means for determining the recursivity noise level and the immobility noise level are intended to produce a noise level constituting both the recursivity noise level and the immobility noise level. The two noise levels are thus identical for the calculation of the recursivity coefficient and for the static filtering. It is then preferable to avoid involving the quantities representative of variations in images preserved in space in this determination. Specifically, one thus avoids a perverse effect of feedback of the detection of static zones on the estimation of the noise level.

In other embodiments, the recursivity and immobility noise levels differ. The former is then preferably greater than the latter.

Thus, in a second embodiment, the means for determining the recursivity noise level are designed to determine the recursivity noise level both as a function of the quantities representative of variations in motion-compensated images and of the quantities representative of variations in images preserved in space. It is thus advantageous to determine the recursivity noise level by a combination of the DFDs and of the FDs, the immobility noise level preferably depending only on the DFDs. Such a technique for determining the recursivity noise level is for example set forth in patent EP-957367. Another advantageous implementation of such a combination consists in determining the recursivity noise level by direct use of the FDs calculated for the static-processing zones of the blocks, instead of considering their average over all the blocks of the field.

Preferably, the means for determining the recursivity noise level and/or immobility noise level are designed to determine one of the noise levels, or both, by means of a weighting of the quantities representative of variations in motion-compensated images, as a function of the motion vectors, this weighting possibly being combined with other means.

The means for determining the recursivity noise level and/or immobility noise level are therefore advantageously designed to distribute the quantities representative of variations in motion-compensated images into classes; these classes are associated respectively with ranges delimited by norms of the motion vectors ranked by increasing values and with corresponding weighting coefficients.

Each of the weighting coefficients is preferably applied to an aggregate of these quantities, that is to say to the partial sum of the class considered. The recursivity noise level and/or immobility noise level are then given by the sum of the aggregates, weighted by the associated weighting coefficients.

This embodiment offers a further substantial improvement in the estimation of the noise level, through a classification of the quantities representative of variations in motion-compensated images (preferably of the DFDs) in the form of a histogram. The robustness of the noise estimation is thereby improved, thus contributing to the overall increase in the performance of the system.

In a first embodiment of the means for determining the recursivity noise level and/or immobility noise level with distribution into classes, these means comprise:

a counting system, intended to count for each of the classes an aggregate of the number of quantities representative of variations in motion-compensated images in all the classes of order less than or equal to the order of this class, and a comparator, intended to compare with a preset value, a ratio of the aggregates for respectively these classes with the aggregate for the class of maximum order, and to produce a minimum order of class for which this ratio is greater than or equal to the preset value.

Moreover, the means for determining the recursivity noise level and/or immobility noise level are designed to assign zero weighting coefficients to the classes of order greater than the said minimum order.

Thus, the classes are taken into account only up to a predetermined percentage of the total number of calculated quantities, for example 10%. Only the classes corresponding to the motion vectors with the lowest norms therefore participate in the calculation of the noise levels. This makes it possible to obtain good reliability of the results, since the weak motions are those which are actually representative of the amount of noise contained in the image sequence. The weighting coefficients employed in the classes taken into account are then advantageously identical, this amounting to taking the mean of the partial sums obtained for these classes.

In a second embodiment of the means for determining the recursivity noise level and/or immobility noise level with distribution into classes, these means are designed to assign the weighting coefficients $\frac{1}{2}^{(i-1)}$ to the classes, i denoting the order of the class.

A means complementary to the weighting of the quantities, for determining the noise levels, advantageously consists in a limitation of the temporal fluctuations of these levels. The noise levels are thus prevented from departing from a range of values containing the previously calculated noise level.

The invention also relates to a coding system comprising a recursive filtering device in accordance with the invention.

It also applies to a process for the motion-compensated recursive filtering of video images before coding. In this process:

a current input image is stored, a blockwise motion estimation is performed in such a way as to produce motion vectors and quantities representative of variations in motion-compensated images, on the basis of the current input image and of at least one input image stored previously, a recursivity noise level is determined as a function of at least the quantities representative of variations in motion-compensated images, a prediction error is calculated between the current input image and an image predicted previously by filtering and motion compensation, a recursivity coefficient is calculated as a function of the recursivity noise level and of the prediction error, a motion-compensated image is calculated on the basis of the current input image and of the motion vectors, the current input image is filtered, producing a weighting of this current input image and of a filtered and motion-compensated image stored previously, by the recursivity coefficient, a motion-compensated image is calculated on the basis of the current filtered image and of the motion vectors, and this filtered and motion-compensated image is stored.

According to the invention:

an immobility noise level is determined as a function of at least the quantities representative of variations in motion-compensated images, and before calculating the motion-compensated image, zones constituting partitions of the blocks employed for the motion estimation are processed:

by calculating in these zones, quantities representative of variations in images preserved in space, on the basis of the current input image and of at least one input image stored previously in the means of storage, and by forcing to zero motion vectors associated with these zones when the quantities representative of variations in images preserved in space are below a threshold dependent on the immobility noise level.

BRIEF DESCRIPTION OF THE DRAWINGS

The invention will be better understood and illustrated by means of advantageous examples of embodiments and implementations, which are in no way limiting, with reference to the appended drawings in which.

DETAILED DESCRIPTION

Figure 1:
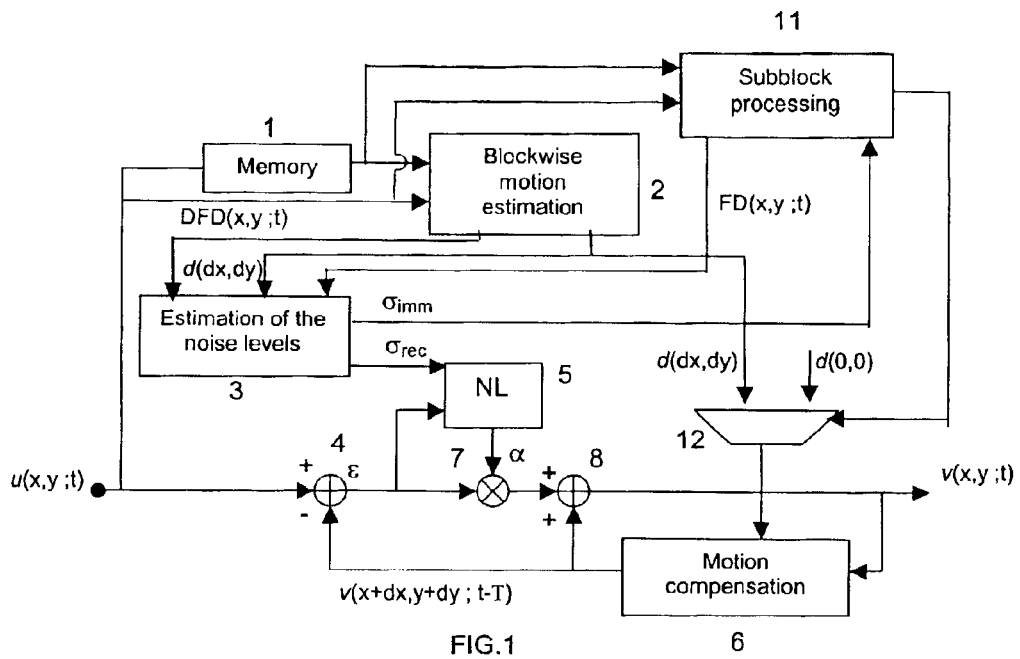
FIG. 1 represents a schematic diagram of a recursive filtering device in accordance with the invention, and FIG. 2 diagrammatically shows an assembly for calculating a predicted noise level, incorporated into the device of FIG. 1.

A motion-compensated recursive filtering device in accordance with the invention (FIG. 1) offers robust noise level estimation and high-performance subblock processing.

We denote by:

x, y and t respectively the abscissa, the ordinate and time, u(x,y;t) a current input signal, u(x,y;t−T) an input signal delayed by a lag T (T represents a lag of one video frame for example), d(dx,dy) a displacement vector, dx denoting the offset (shift) in displacement along the abscissa axis and dy the offset in displacement along the coordinate axis, v(x,y;t) the output of the filter, v(x+dx,y+dy;t−T) the motion-compensated output of the filter delayed by a lag T, more commonly called the prediction (with filtering), α a recursivity coefficient for the current sample, $\sigma_{rec}$ a recursivity noise level estimated for the entire image, $\sigma_{imm}$ an immobility noise level estimated for the entire image, ε a prediction error for the current sample, NL a nonlinear filter α=f(ε,$\sigma_{rec}$), FD(x,y;t): FD(x,y;t)=u(x,y;t)−u(x,y;t−T) applied to a pixel or to a block of pixels, DFD(x,y;t): DFD(x,y;t)=u(x,y;t)−u(x+dx,y+dy;t−T) applied to a pixel or to a block of pixels.

The filtering device comprises a memory 1 designed to store an input image (signal u(x,y;t)) and a blockwise motion estimator 2, designed to produce, blockwise, motion vectors d and DFDs, from a current input image (signal u(x,y;t)) and from an input image stored previously (signal u(x,y;t−T)) in the memory 1.

The device is also provided with a unit 3 for determining a recursivity noise level $\sigma_{rec}$ and an immobility noise level $\sigma_{imm}$ as a function of the DFDs and of the motion vectors d received from the motion estimator 2. The recursivity noise level $\sigma_{rec}$ is used to calculate a recursivity coefficient $\alpha$, whereas the immobility noise level $\sigma_{imm}$ serves to improve the filtering by refining the motion compensation of the previously filtered image, as is set forth hereinbelow.

It also comprises a first adder 4 capable of subtracting the current input image (signal u(x,y;t)) and an image predicted previously by motion compensation (signal v(x,y;t−T)) on the basis of a filtered image. The adder 4 thus produces a prediction error $\epsilon$.

A module 5 for calculating the recursivity coefficient $\alpha$ is intended to receive the recursivity noise level $\sigma_{rec}$ from the unit 3 and the prediction error $\epsilon$ from the calculation module 4, and to calculate the recursivity coefficient $\alpha$ by a nonlinear filter function (NL). A multiplier 7 makes it possible to multiply the prediction error $\epsilon$ at the output of the adder 4 by the recursivity coefficient $\alpha$ received from the calculation module 5. Moreover, a second adder 8 is intended to receive the result of this product from the multiplier 7 and to add this product to the image predicted previously by motion compensation (signal v(x,y;t−T)) on the basis of a filtered image. It is the result of this addition which constitutes the current filtered image, produced at the output of the device (signal v(x,y;t)).

We therefore have:

$$v(x, y;t) = \alpha \times u(x, y;t) + (1-\alpha) \times v(x+dx, y+dy; t-T))$$

The device furthermore comprises a unit 6 for calculating and for storing an image motion-compensated on the basis of an output image of the device (signal v(x,y;t)) and motion vectors d calculated by the motion estimator 2. However, a choice between the current motion vector d and the zero vector is performed beforehand, as described hereinbelow. The unit 6 has an output used, with a delay (lag T), both at the inputs of the adders 4 and 8.

The recursive filtering device also comprises a decisional unit 11 and a selection unit 12.

The decisional unit 11 has three inputs respectively receiving a current input image (signal u(x,y;t)), an input image stored previously in the memory 1 (signal u(x,y;t−T)) and the immobility noise level $\sigma_{imm}$. It is furnished with a control output linked to the selection unit 12. The decisional unit 11 is designed to calculate the FDs over various zones of each block and to compare the FDs with the immobility noise level $\sigma_{imm}$ (or with a threshold dependent on this noise level). These zones are preferably subblocks of smaller size than that of the blocks used for the motion estimation, for example 4×4 pixels. Depending on whether the FDs are less than (respectively greater than) the immobility noise level $\sigma_{imm}$, the zone of the image processed is decreed static (respectively nonstatic). The decisional unit 11 then gives, through its control output, the selection unit 12 instructions for zeroing the motion vectors d of the zones declared static. Moreover, in the example represented, the FDs of the zones declared static are sent to the unit 3 so as to participate in the estimation of one at least of the noise levels.

The selection unit 12 comprises an input for receiving the motion vectors d originating from the motion estimator 2, an input for zeroing the motion vectors and a control input linked to the decisional unit 11. It makes a choice between the current motion vector d and the zero vector. This choice is conditioned by the result emanating from the decisional unit 11. Thus, in the presence of static zones, the motion vector is forced to zero. In the converse case, the current motion vector d is chosen. The motion vectors produced are sent by an output to the motion compensation unit 6.

The processing of the static zones has the effect in particular of remedying defects introduced by the blockwise motion estimator 2 in the presence of noise, in zones which are homogeneous in space and temporally (dispersion of the motion field), this processing being based on the analysis of the difference between two subblocks occupying the same spatial position but at different time instants. The comparison of the FD of each zone with the threshold dependent on the immobility noise level $\sigma_{imm}$ makes it possible to detect the zones which are identical in space and in time for a noisy or non-noisy video sequence. Thus, the phenomena of temporal flickering and swarming in zones which are in reality identical in space and time are strongly attenuated. Apart from this aspect, this processing also makes it possible to perform a "clipping" of the objects in motion: specifically, the blockwise motion estimation does not differentiate, in the actual interior of a block, between an object or a part of this object and the background of the scene. The subblock processing improves this aspect by imposing zero displacement vectors d in zones which are identical in space and time in the actual interior of each block.

Figure 2:
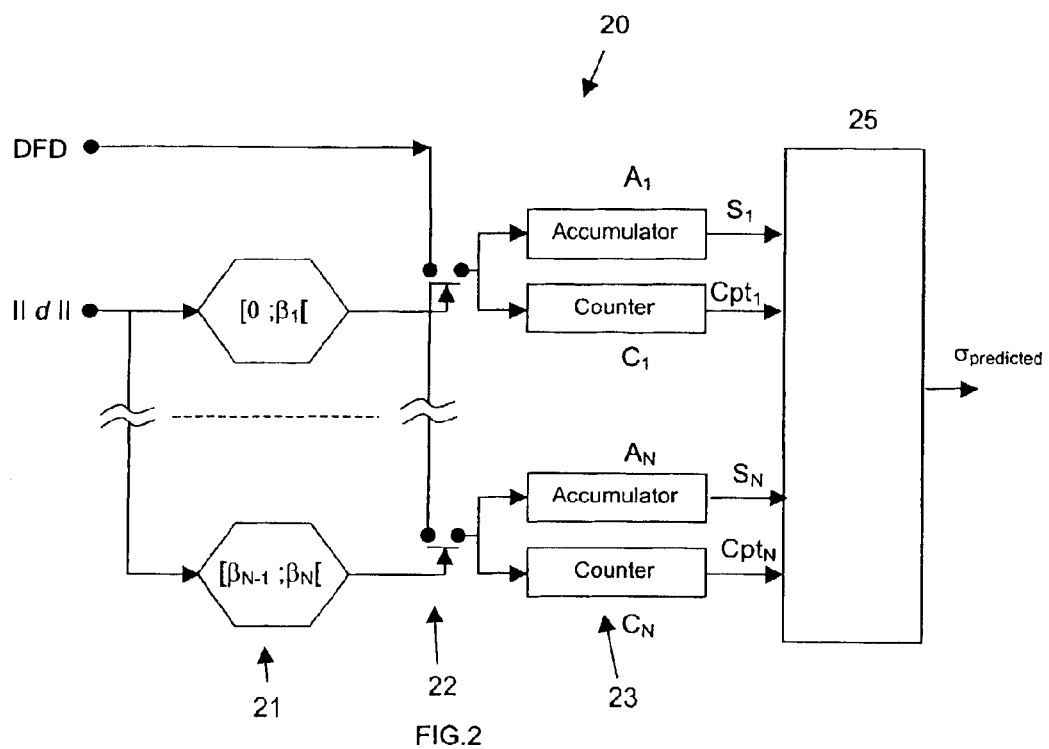

Particular embodiments of the unit 3 for determining the noise levels will now be detailed. These embodiments are especially appropriate to the device described. According to these embodiments, the unit 3 comprises an assembly 20 for determining a predicted noise level $\sigma_{predicted}$ (FIG. 2), which is then used to calculate the recursivity noise level $\sigma_{rec}$ and the immobility noise level $\sigma_{imm}$. In one of the embodiments, these two noise levels are identical and equal to the predicted noise level $\sigma_{predicted}$. In other embodiments, they differ from one another.

The assembly 20 has two inputs respectively receiving the DFDs and the norms ‖d‖ of the motion vectors d, and an output giving the predicted noise level $\sigma_{predicted}$. It comprises a first stage 21 for distributing the norms ‖d‖ of the motion vectors d into ranges [0; $\beta_1$[ . . . [$\beta_{N-1}$; $\beta_N$[ of increasing values ($\beta_i$ being the $i^{th}$ classification bound). A slicing into N ranges (of the same dynamic swing or otherwise) which are obtained from the maximum modulus of the motion vector is used for this.

The assembly 20 also comprises a second stage 22 for steering the DFDs, according to the membership range of the norms ‖d‖ of the motion vectors d in the various zones considered. A third counting and aggregating stage 23 comprises N pairs each consisting of an accumulator $A_i$ and of a counter $C_i$, for i=1 . . . N, each of these pairs being associated with one of the ranges of the distributing stage 21. Each pair thus defines a membership class for the DFDs, corresponding to one of the ranges of the norms ‖d‖. The accumulators $A_i$ and the counters $C_i$ have the respective functions of aggregating the values of the DFDs steered to them and of counting them. They produce as outputs respectively partial sums $S_i$ and numbers $Cpt_i$.

A module 25 for utilizing the classification, downstream of the third stage 23, makes it possible to produce the predicted noise level $\sigma_{predicted}$ as a function of the partial sums $S_i$ and of the numbers $Cpt_i$ of each class.

According to a first method, used in the module 25, of calculating the predicted noise level $\sigma_{predicted}$, only 10% of the DFDs are considered, beginning with the first class (class 1) and aggregating the partial sums over the following classes until a number greater than 10% of aggregated DFDs is obtained. The predicted noise level $\sigma_{predicted}$ is then equal to the mean of the partial sums of the successive classes considered. It represents the noise level emanating from at least 10% of the blocks of pixels exhibiting the smallest displacement.

According to a second method, a weighted mean of the partial sums is computed. The weighting then favours the classes representing a small motion vector modulus. The weighting factors ($\phi_i$) are advantageously as follows:

$$\phi i = \frac{1}{2^{(i-1)}}$$

with i representing the index of the class and lying between 1 and N (number of classes).

Advantageously, the module 25 only permits a certain range of fluctuation ($\Delta\sigma_{low}$ and $\Delta\sigma_{high}$) as a function of the predicted noise level previously calculated $\sigma_{prec}$ (MED denoting the median value between the three values in parameters):

$$\sigma_{predicted} = \text{MED}[\sigma_{prec} - \Delta\sigma_{low}, \sigma_{predicted}, \sigma_{prec} + \Delta\sigma_{high}]$$

Thus, the predicted noise level $\sigma_{predicted}$ emanates from the classification of the DFDs, performed on the basis of the modulus of the motion vectors d, by considering exclusively or essentially the DFDs relating to a weak motion.

A very reliable noise level is thus obtained. Specifically, the DFDs are very susceptible on the one hand to errors due to the motion estimator and on the other hand to strong motions. The latter potentially introduce distortions in the shapes and the objects, the consequences thereof being the falsification of the DFDs by increasing them greatly.

In a variant embodiment, the static filtering is performed on pixels of the blocks considered, instead of subblocks.

What is claimed is:

1. Device for the motion-compensated recursive filtering of video images before coding, comprising:

means of storage of at least one input image, a blockwise motion estimation module, designed to produce motion vectors (d) blockwise and quantities representative of variations in motion-compensated images (DFD), on the basis of a current input image and of at least one input image stored previously in the said means of storage, means for determining a recursivity noise level ($\sigma_{rec}$) as a function of at least the said quantities representative of variations in motion-compensated images (DFD), a module for calculating a prediction error ($\epsilon$), between a current input image and an image predicted previously by filtering and motion compensation, a module for calculating a recursivity coefficient ($\alpha$) as a function of the said recursivity noise level ($\sigma_{rec}$) and of the said prediction error ($\epsilon$), means for calculating a motion-compensated image on the basis of a filtered image and of the said motion vectors (d), means of filtering, intended to produce a weighting of the current input image and of a filtered and motion-compensated image stored previously, by the recursivity coefficient ($\alpha$), and means of storage of at least one filtered and motion-compensated image, produced by the means for calculating motion-compensated images, wherein the said filtering device comprises:

means for determining an immobility noise level ($\sigma_{imm}$) as a function of at least the said quantities representative of variations in motion-compensated images (DFD), and an assembly for processing zones constituting partitions of the said blocks employed for the motion estimation, comprising:

means of calculation in the said zones, of quantities representative of variations in images preserved in space (FD), on the basis of a current input image and of at least one input image stored previously in the said means of storage of input images, and means of zeroing the motion vectors (d) associated with the said zones when the said quantities representative of variations in images preserved in space (FD) are below a threshold dependent on the immobility noise level ($\sigma_{imm}$).

2. Recursive filtering device according to claim 1, wherein the assembly for processing zones uses zones consisting of subblocks of the said blocks employed for the motion estimation.

3. Recursive filtering device according to claim 1, wherein the said means for determining the recursivity noise level ($\sigma_{rec}$) and the immobility noise level ($\sigma_{imm}$) are intended to produce a noise level constituting both the recursivity noise level and the immobility noise level.

4. Recursive filtering device according to claim 1, wherein the said means for determining the recursivity noise level ($\sigma_{rec}$) are designed to determine the recursivity noise level both as a function of the said quantities representative of variations in motion-compensated images (DFD) and of the said quantities representative of variations in images preserved in space (FD).

5. Recursive filtering device according to claim 1, wherein the said means for determining the recursivity noise level ($\sigma_{rec}$) and/or immobility noise level ($\sigma_{mm}$) are designed to determine at least one of the noise levels at least by means of a weighting of the said quantities representative of variations in motion-compensated images (DFD), as a function of the motion vectors (d).

6. Recursive filtering device according to claim 5, wherein the said means for determining the recursivity noise level ($\sigma_{rec}$) and/or immobility noise level ($\sigma_{imm}$) are designed to distribute the said quantities representative of variations in motion-compensated images (DFD) into classes associated respectively with ranges ([0; $\beta_1$[ . . . [$\beta_{n-1}$; $\beta_n$[) delimited by norms of the motion vectors (IIdII) ranked by increasing values and with corresponding weighting coefficients.

7. Recursive filtering device according to claim 6, wherein the said means for determining the recursivity noise level ($\sigma_{rec}$) and/or immobility noise level ($\sigma_{imm}$) comprise a counting system, intended to count for each of the said classes an aggregate of the number of the quantities representative of variations in motion-compensated images (DFD) in all the classes of order lower than or equal to the order of the said class, and a comparator intended to compare with a preset value a ratio of the said aggregates for respectively the said classes with the said aggregate for the class of maximum order and to produce a minimum order of class for which the said ratio is greater than or equal to the preset value, the said means (3) for determining the recursivity noise level ($\sigma_{rec}$) and/or immobility noise level ($\sigma_{imm}$) being designed to assign zero weighting coefficients to the classes of order greater than the said minimum order.

8. Recursive filtering device according to claim 6, wherein the said means for determining the recursivity noise level ($\sigma_{rec}$) and/or immobility noise level ($\sigma_{imm}$) are designed to assign the weighting coefficients $\frac{1}{2}^{(i-1)}$ to the said classes, i denoting the order of the class.

9. Coding system comprising a recursive filtering device in accordance with claim 1.

10. Process for the motion-compensated recursive filtering of video images before coding, in which:

a current input image is stored, a blockwise motion estimation is performed in such a way as to produce motion vectors (d) and quantities representative of variations in motion-compensated images (DFD), on the basis of the said current input image and of at least one input image stored previously, a recursivity noise level ($\sigma_{rec}$) is determined as a function of at least the said quantities representative of variations in motion-compensated images (DFD), a prediction error ($\epsilon$) is calculated between the current input image and an image predicted previously by filtering and motion compensation, a recursivity coefficient ($\alpha$) is calculated as a function of the said recursivity noise level ($\sigma_{rec}$) and of the said prediction error ($\epsilon$), the current input image is filtered, by producing a weighting of the said current input image and of a filtered and motion-compensated image stored previously, by the recursivity coefficient ($\alpha$), a motion-compensated image is calculated on the basis of the current filtered image and of the said motion vectors (d), and the said filtered and motion-compensated image is stored, wherein:

an immobility noise level ($\sigma_{imm}$) is determined as a function of at least the said quantities representative of variations in motion-compensated images (DFD), and before calculating the said motion-compensated image, zones constituting partitions of the said blocks employed for the motion estimation are processed:

by calculating in the said zones, quantities representative of variations in images preserved in space (FD), on the basis of the current input image and of at least one input image stored previously in the said means of storage, and by forcing to zero motion vectors (d) associated with the said zones when the said quantities representative of variations in images preserved in space (FD) are below a threshold dependent on the immobility noise level ($\sigma_{imm}$).

* * * * *